United States Patent
Humble et al.

(10) Patent No.: US 9,237,161 B2
(45) Date of Patent: Jan. 12, 2016

(54) MALWARE DETECTION AND IDENTIFICATION

(71) Applicant: Cincinnati Bell, Inc., Cincinnati, OH (US)

(72) Inventors: Jeremy Richard Humble, Englewood, OH (US); Cole Robinette, Waynesville, OH (US)

(73) Assignee: Morphick, Inc., Cincinnati, OH (US)

( * ) Notice: Subject to any disclaimer, the term of this patent is extended or adjusted under 35 U.S.C. 154(b) by 0 days.

(21) Appl. No.: 14/107,605

(22) Filed: Dec. 16, 2013

(65) Prior Publication Data

US 2015/0172303 A1 Jun. 18, 2015

(51) Int. Cl.
*H04L 29/06* (2006.01)

(52) U.S. Cl.
CPC .................................. *H04L 63/1408* (2013.01)

(58) Field of Classification Search
CPC ............ H04L 63/1408; H04L 63/1416; H04L 63/1433; H04L 63/1441
USPC ...................................................... 726/22–25
See application file for complete search history.

(56) References Cited

U.S. PATENT DOCUMENTS

| | | | | |
|---|---|---|---|---|
| 2006/0026675 A1* | 2/2006 | Cai | .................. | G06F 21/562 726/22 |
| 2010/0185567 A1* | 7/2010 | Niemasik et al. | ............... | 706/12 |
| 2012/0066346 A1* | 3/2012 | Virmani et al. | ............... | 709/219 |
| 2012/0084859 A1* | 4/2012 | Radinsky et al. | ............... | 726/23 |
| 2012/0158626 A1* | 6/2012 | Zhu et al. | ......................... | 706/13 |
| 2012/0216280 A1* | 8/2012 | Zorn | ...................... | G06N 7/005 726/23 |
| 2012/0239751 A1* | 9/2012 | Alperovitch et al. | ......... | 709/204 |
| 2012/0311708 A1* | 12/2012 | Agarwal et al. | .................. | 726/24 |
| 2012/0317644 A1* | 12/2012 | Kumar et al. | .................... | 726/24 |
| 2012/0323829 A1* | 12/2012 | Stokes et al. | .................... | 706/12 |
| 2013/0198119 A1* | 8/2013 | Eberhardt et al. | ............... | 706/12 |
| 2013/0247192 A1* | 9/2013 | Krasser | ............... | H04L 63/1425 726/23 |
| 2014/0090061 A1* | 3/2014 | Avasarala et al. | ............... | 726/24 |
| 2014/0181973 A1* | 6/2014 | Lee et al. | ......................... | 726/23 |
| 2014/0189864 A1* | 7/2014 | Wang et al. | ..................... | 726/23 |
| 2015/0096024 A1* | 4/2015 | Haq | ....................... | H04L 63/145 726/23 |
| 2015/0180890 A1* | 6/2015 | Ronen | ..................... | G06F 21/56 726/23 |
| 2015/0200962 A1* | 7/2015 | Xu | ......................... | G06F 21/562 726/23 |

OTHER PUBLICATIONS

Michael Rosenblum and Paul Dorsey "PL/SQL and your database—Knowing Just enough about relational databases", excerpt from book "Oracle PL/SQL for Dummies", 2006, pp. 9-22.*

(Continued)

*Primary Examiner* — Catherine Thiaw
(74) *Attorney, Agent, or Firm* — Baker & Hostetler LLP (57) ABSTRACT

A malware detection/identification system scores each subject file and/or scores 'tags' obtained from the subject file to determine the potential that the file contains malicious components. A file or tag score tending to indicate that the subject file may contain malicious components/properties/attributes, may be used to notify the system (and a user of the system) that the file may be potentially malicious, so that the file may be quarantined and subject to further analysis. Embodiments of the current disclosure utilize a database structure that contains multitudes (e.g., hundreds, thousands, or even millions) of "tags" that have been pulled from known malicious and known benign sample files, where the database provides many-to-many relations between the known sample files and the tags.

22 Claims, 3 Drawing Sheets

(56) References Cited

OTHER PUBLICATIONS

Yousra Aafer, Wenliang Du and Heng Yin "DroidAPIMiner: mining API-level features for robust malware detection in Android", Sep. 2013, included in SecureComm, LNICST 127, pp. 86-103, T. Zia (eds), Springer.*

Mamoun Alazab, Sitalakshmi Venkatraman, Paul Watters, and Moutaz Alazab "Zero-day malware detection based on supervised learning algorithms of API call signatures", Proceedings of the 9th Australasian data mining conference (AusDM'11), Ballarat, Australia, 2011, pp. 171-181.*

Raman, Karthik, Selecting Features to Classify Malware, InfoSec Southwest 2012, Mar. 30-Apr. 1, 2012, 5 pages, InfoSec Southwest 2012 conference paper, Austin, Texas.

Bayer, et al., Scalable Behavior-Based Malware Clustering, Proceedings of the 16th Annual Network and Distributed System Security Symposium, Feb. 8-11, 2009, 18 pages, 16th Annual Network and Distributed System Security Symposium conference paper, San Diego, CA.

* cited by examiner

FIG. 1

| Field | Description | Example 1 | Example 2 | Example 3 |
|---|---|---|---|---|
| ID | Unique Identifier for the Tag | 10391 | 8491 | 0912 |
| Type | Type of Information Held | Outbound IP Connection | API Call | Ascii String |
| Value | Primary Value Being Stored | 123.45.67.89 | Write File | 'passwOrd' |
| Description | Further Description of the Tag | Port 8080 | C:\windows\bad.exe | |
| OS | Which OS the Sample Was Run Under When Exhibiting the Behavior Captured in this Tag | Windows 7 64-bit | Windows XP SP3 | All |

MALWARE DETECTION AND IDENTIFICATION

FIELD OF THE INVENTION

The current disclosure pertains to systems and methods for detection and/or identification of potential malicious computer files (i.e., "malware") on a computer system, or passing through an electronic communication channel such as through email exchanges or through network sensors.

BACKGROUND

Malicious software, otherwise known as "malware", presents a serious problem for many types of computer systems. The existence of malware in particular computer systems can interfere with the computer system's operations, expose or release proprietary information contained in the computer system to third parties, or allow third parties to gain unauthorized access to such computer systems. Malware may include computer viruses, ransomware, worms, Trojan horses, rootkits, keyloggers, dialers, spyware, adware and the like. Most anti-virus and anti-malware tools work primarily upon the ability to identify computer files as being a malware threat. Typical malware products detect issues based on heuristics or signatures—i.e., based on information that can be assessed to be bad. A potential problem with these state of the art products is that if the subject file does not present a specific heuristic or signature attributable to know malware, it is still possible that the file may contain other properties that may be associated with a potential malware threat.

SUMMARY OF THE INVENTION

The current disclosure provides a malware detection/identification system that mathematically scores each subject file and/or scores 'tags' obtained from the subject file to determine the potential that the file contains malicious components. A score, tending to indicate that the subject file may contain malicious components/properties/attributes, may be used to notify the system (and a user of the system) that the file may be potentially malicious, so that the file may be quarantined and subject to further analysis. Embodiments of the current disclosure utilize a database that contains multitudes (e.g., hundreds, thousands, or even millions) of "tags" that have been pulled from known malicious and known benign sample files, where the database provides many-to-many relations between the known sample files and the tags. The "tags" may be properties, attributes, components, or other information pulled from the sample file or pulled from other files or data structures after running in a "sandbox" computer system, for example, to observe the sample's behavior. The tags may include metadata information, hashes, attributes and/or behaviors that are tracked in the sample files and/or the sandbox files. Types of such tags may include, for example (and without limitation), IP or domain connections, API calls, Windows registry modifications, created/modified/deleted files, ASCII or Unicode strings, Traditional signature matches on specific strings or sections of binary data, Fields from the file's header, and other information pulled from the file using internal tools.

The known sample files and the unknown received files can be represented as a set of tags, allowing a huge variety of data mining algorithms to be applied to the data. For example, a "maliciousness" rating for a particular tag may be determined by looking at the percent of the known sample files containing the tag that are malicious versus the percent of known sample files containing the tag that are benign. So, a tag which shows up in 90% of malware and 10% of benign files would tend to have a score indicating that such a tag may be more likely to be contained in a malicious file. Additionally, the tag database may be used to determine the similarity between an unknown received file and known malicious and/or benign files present in the database. For example, a high similarity score between a received, uncategorized sample file and a categorized file present in the database may help an analyst rapidly understand an unknown threat by comparing it to the highly similar, previously documented file and highlighting the overlaps and differences.

An example system for malware file detection and/or identification according to the current disclosure may include: database(s) containing a multitude of tags, where each tag is associated with one or more known malicious files and/or one or more known benign files; and where the tags may include a tag identification code, a tag type corresponding to the type of information held by the tag, and a tag value corresponding to the value of the information held by the tag. The database(s) also include a many-to-many relational structure relating each known benign file to the plurality of tags respectively associated with that known benign file, and relating each known malicious file with the plurality of tags respectively associated with that known malicious file. The system may also include at least one computer (such as, for example, one or more computer servers), having access to the database, and being programmed to perform the steps of: (a) receiving a file, (b) analyzing the file to generate a plurality of tags associated with the received file, (c) comparing the tags generated from the received file with the tags in the database(s) to identify tags in the database(s) that match tags generated from the received file, and calculating a tag score for a tag generated from the received file based upon the number of malicious files associated with a matching tag from the database(s) and the number of benign files associated with the matching tag from the database(s). In a detailed embodiment, the computer may be further programmed to render a notification that the received file is potentially malicious if the tag score is above or below a predetermined value.

In a detailed embodiment, the computer may be further programmed to dynamically update the relational structure of the database(s) based upon a categorization of the received file as a malicious file or a benign file.

In a detailed embodiment, the computer may be further programmed to calculate a weight value for the tag score based upon the number of known malicious and benign files associated with the matching tag as compared to the total number of known malicious and benign files associated with tags in the relational structure in the one or more databases. In a further detailed embodiment, the weight value may only be calculated for tags of a particular tag type. Alternatively, or in addition, the computer may be further programmed to: calculate a plurality of tag scores and weight values for a respective plurality of tags generated from the received file; and calculate a similarity score between the received file and another file based upon the plurality of tag scores and weight values.

In a detailed embodiment, the computer may be further programmed to calculate a similarity score for the received file versus a known file based upon the tags generated from the received file and the tags in the database(s) associated with the known file. In a further detailed embodiment, the similarity score may be calculated for a plurality of known files and the computer may be further programmed to determine the known file(s) having the highest similarity scores. Alternatively, or in addition, the step of calculating a similarity score may be performed upon calculating a tag score that indicates the tag is likely to be associated with a malicious file. Alternatively, or in addition, the similarity score may be calculated for all known malicious files having the tag that has been indicated to be likely associated with a malicious file. Alternatively, or in addition, the computer may be further configured to generate a display illustrating commonalties between the received file and the one or more known files having the highest similarity scores.

An example system for malware file detection and/or identification according to the current disclosure may include: database(s) containing a multitude of tags, where each tag is associated with one or more known malicious files and/or one or more known benign files, and where the tags include a tag identification code, a tag type corresponding to the type of information held by the tag, and a tag value corresponding to the value of the information held by the tag. The database(s) may include a many-to-many relational structure relating each known benign file to the plurality of tags respectively associated with that known benign file, and relating each known malicious file with the plurality of tags respectively associated with that known malicious file. And the system may also include at least one computer, having access to the database, and being programmed to perform the steps of: (a) receiving a file, (b) analyzing the file to generate a plurality of tags associated with the received file, (c) comparing the tags generated from the received file with the tags in the database (s) to identify tags in the database(s) that match tags generated from the received file, (d) scoring the matching tags, (e) scoring the received file based upon scores of the matching tags, (f) calculating a similarity score for the received file versus one or more known files based upon the tags generated from the received file and the tags in the database(s) associated with the known file(s), and (g) reporting similar files based upon the similarity score(s). In a more detailed embodiment, the step of calculating a similarity score may involve building a distance matrix between the tags generated from the received file and the tags in the database(s) associated with the known file(s). In a further detailed embodiment, the similarity score may be calculated utilizing a Jaccard Index.

DETAILED DESCRIPTION

Figure 1:
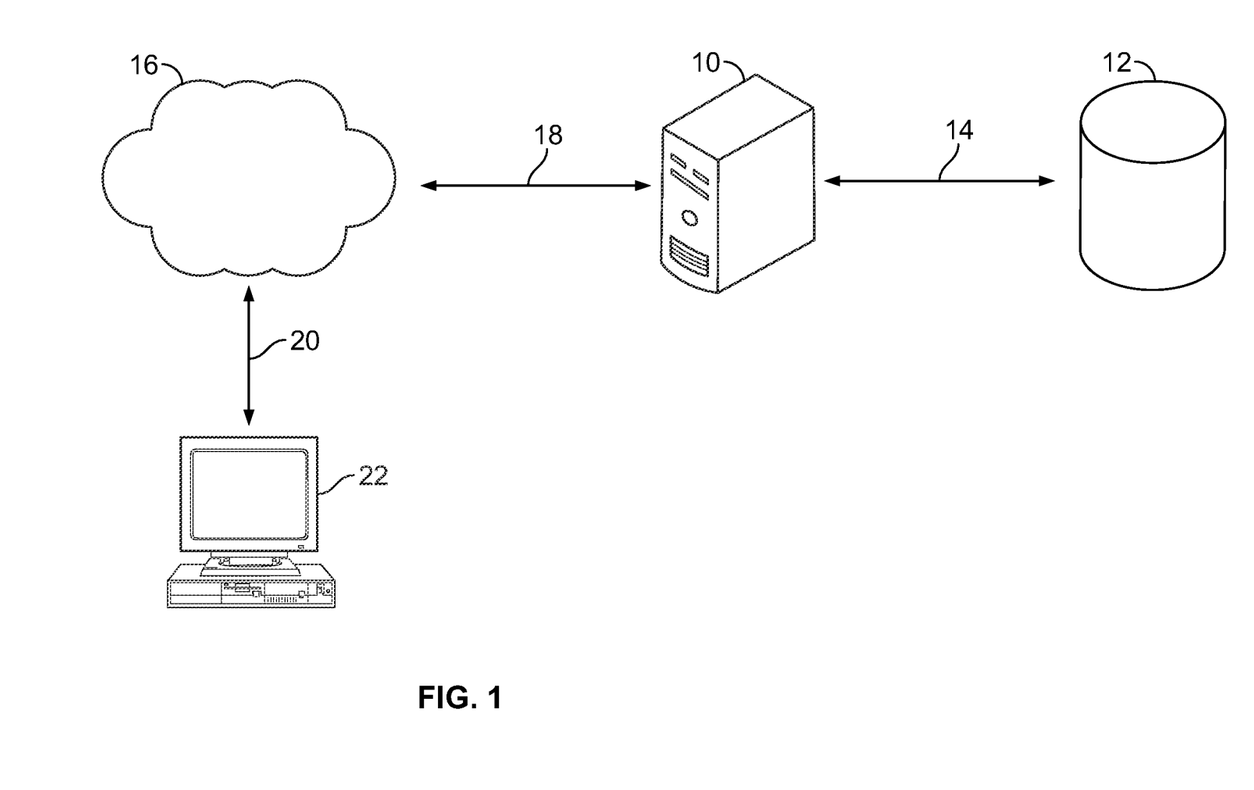
FIG. 1 provides a block diagram representation of a computing environment for use with embodiments of the current disclosure.

FIG. 1 provides a very basic computing environment which may be used with embodiments of the current disclosure. The example computing environment may include a computer server 10 (or a plurality of computer servers) coupled to a database 12 (or a plurality of databases) by a data link 14 and coupled to a computer network (such as the Internet) 16 by a data link 18. Also coupled to the computer network 16 by data link 20 is a user computer terminal 22.

The database 12 includes a many-to-many database structure containing tag IDs for tags that have been pulled from both known malicious files and known benign files, and containing associations between the tag IDs and the known files. The "tags" may be properties, attributes, components, or other information pulled from the sample file or pulled from other files or data structures in a "sandbox" computer system on which the sample file had been present. The tags may include metadata information, hashes, attributes and/or behaviors that are tracked in the sample files and/or the sandbox files. Types of such tags may include, for example (and without limitation), IP or domain connections, API calls, Windows registry modifications, created/modified/deleted files, ASCII or Unicode strings, Traditional signature matches on specific strings or sections of binary data, Fields from the file's header, and other information pulled from the file using internal tools. For example, tags from malicious files can be obtained by operating the malicious file in a sandbox test environment in which the malicious file is run on a clean system and the test environment is then analyzed to determine what changes to the system have been made as a result of running the malware on the clean system. From the analysis of the changed system (such as analyzing metadata and other information), tags may be created from that analysis and added to the many-to-many database in association with the malicious file under test.

Another example of an analyzer tool that may be used to identify or pull tags from files under test may be a Cuckoo Sandbox. Cuckoo Sandbox is an open source project that utilizes a virtual machine infrastructure (which is configurable) to deploy a sample to one of a set of virtual machines (the amount is also configurable). While the sample is run, its behavior is monitored and logged by a Cuckoo agent program which is also running. After execution is complete or timed out, the Sandbox reverts the virtual machine to a previously saved, clean state, where it is ready to analyze another sample.

Figure 2:
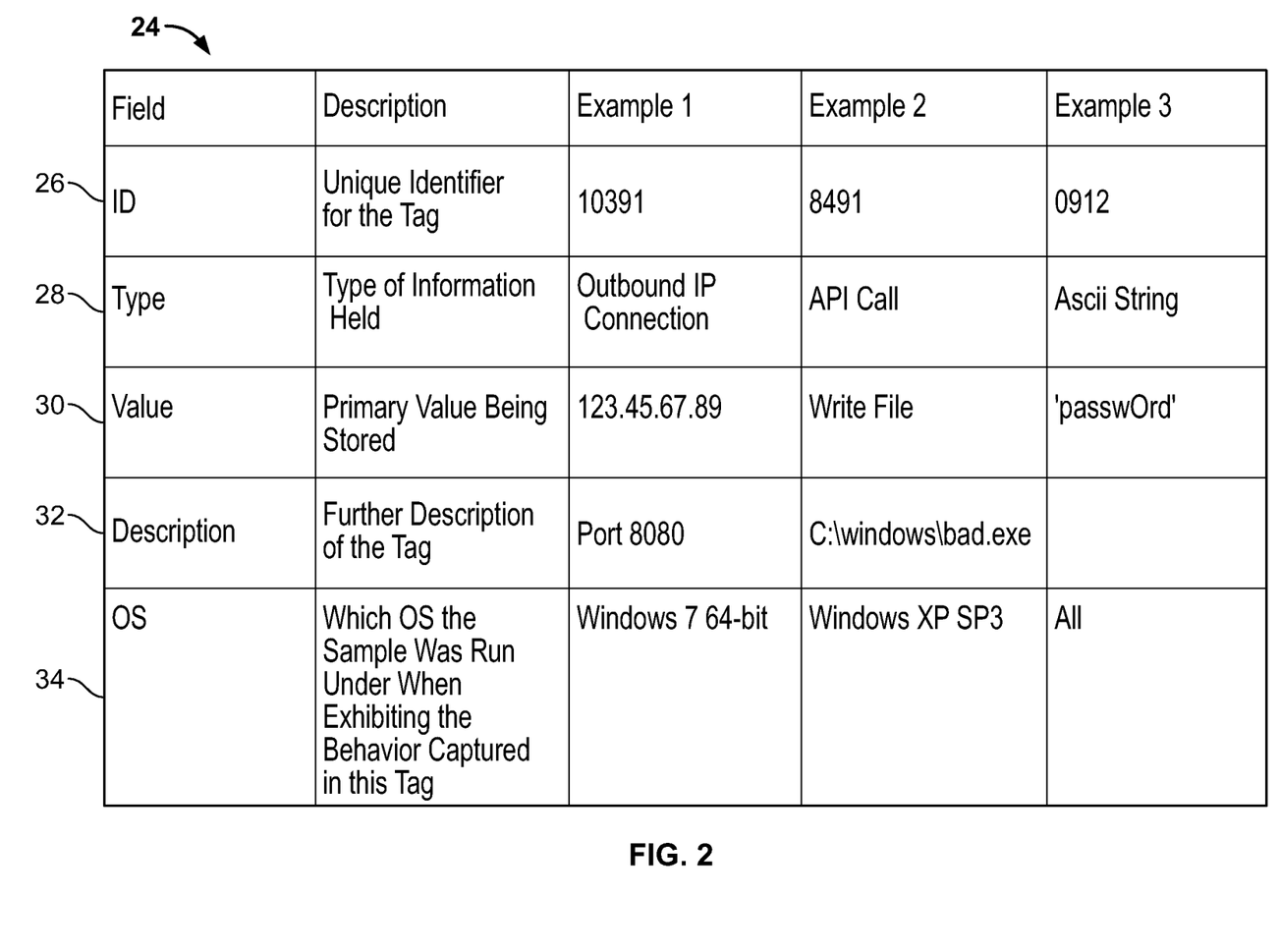
FIG. 2 presents an example database structure for example tags associated with embodiments of the current disclosure.

As shown in FIG. 2, an example database structure 24 for the tags pulled from known and/or unknown sample files is provided. For each tag, the following fields may be provided in the database structure: a tag identification number or "ID" 26, which is a unique identifier for the tag (examples, include "10391," "8491," and "0912"); a tag type 28, which is the type of information held or represented by the tag (examples include outbound IP connection, API call, ASCII string); a tag value 30, which is the primary value being stored for the respective tag type (examples include "123.45.67.89" for the outbound IP connection, "WriteFile" for the API call, and "passw0rd" for the ASCII string); a tag description 32, which may be a further description of the tag (examples include "Port 8080" for the outbound IP connection, "C:\windows\bad.exe" for the API call); and an associated operating system identification "OS" 34, which is the operating system the sample was run under when exhibiting the behavior captured in this tag (examples may include "Windows 7 64-bit," "Windows XP SP3," and "All").

In an embodiment a hash tag generator may be applied to each file and tag under test. The generated has tags could be used as the unique identifier for each file and tag.

Figure 3:
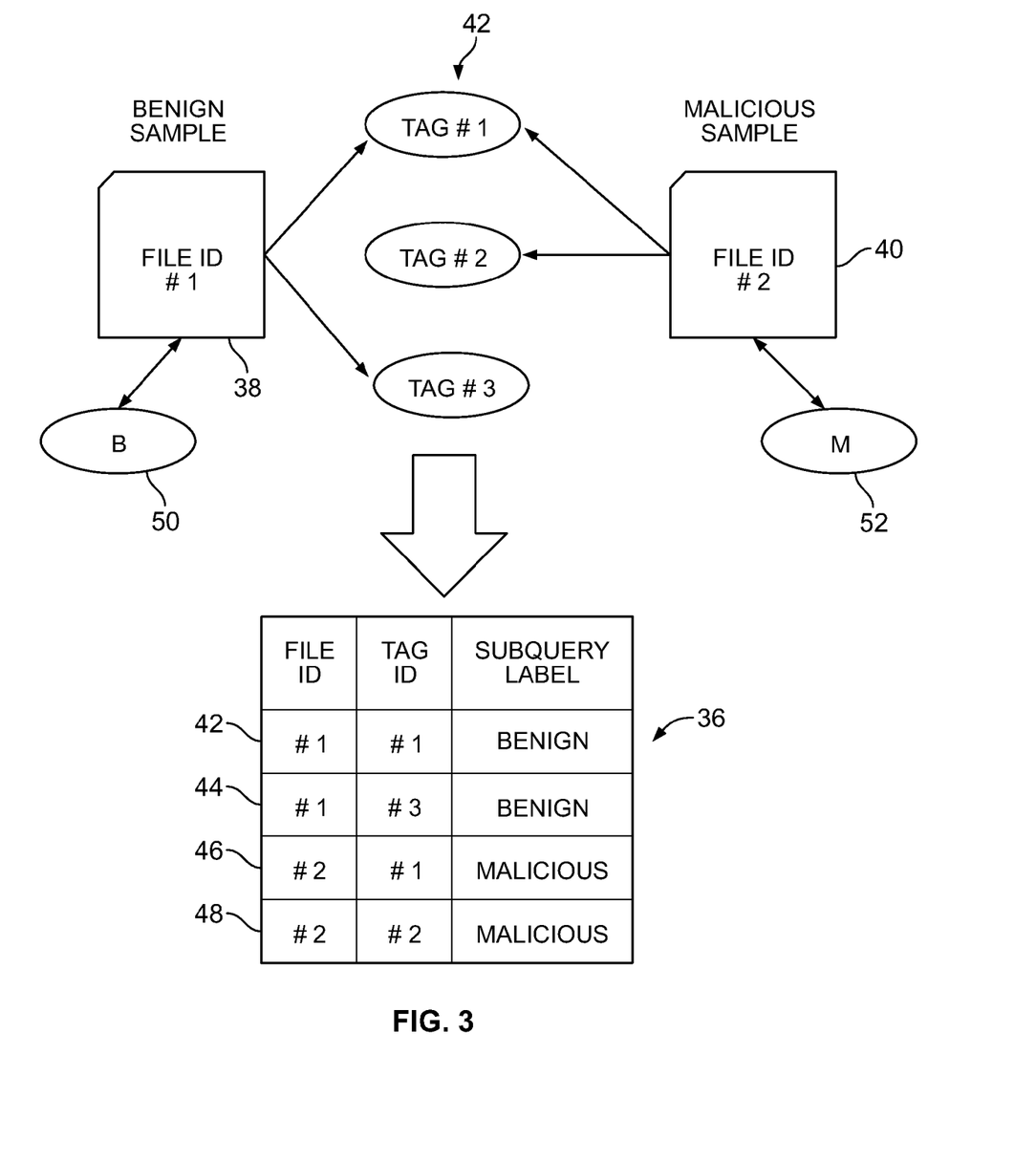
FIG. 3 provides a block diagram illustration of building an example many-to-many database structure for associating tags from known benign and/or malicious files for use in data mining algorithms according to the current disclosure.

As shown in FIG. 3, a simplified version of the many-to-many database structure 36 is illustrated. To generate such a structure, known benign files 38 and known malicious files 40 may be analyzed (such as, for example, using the analyzers discussed above) to derive the tags 42 associated with each of these files. For example, a benign file sample having a file ID #1 may be analyzed to derive tag ID #1 and tag ID #3, while a known malicious file sample 40 may be analyzed to derive tag ID #1 and tag ID #2. Consequently, the many-to-many database structure 36 will show the file ID #1 being associated with the tag ID #1 (see row 42) and will show the file ID #1 being associated with tag ID #3 (see row 44), while the file ID

2 will be associated with tag ID #1 (see row 46) and associated with tag ID #2 (see row 48). Each association may also include a sub-query label, which indicates whether or not the file ID is benign or malicious. As shown in this example, the known benign file 38 includes a sub-query label of "B" 50, indicating that the file ID #1 is "benign"; and the known malicious sample 40, having file ID #2, has a sub-query label of "M" 52, indicating that the file associated with file ID #2 is "malicious". In practice, the many-to-many database structure may have many thousands, hundreds-of-thousands or even millions of file ID/tag ID associations, but the example many-to-many database structure 36 shown in FIG. 3 is provided to give a simplified explanation of the structure. By providing by such a many-to-many database structure 36, a variety of data mining algorithms may be applied to the data for detecting and/or identifying potential malware files.

An example data mining algorithm that may be applied to the many-to-many database structure 36 is an algorithm to evaluate a "maliciousness" rating for a tag by looking at the percent of its associated file samples in the many-to-many database structure 36 (i.e., files/samples "linked" to the tag) that are labeled as malicious versus the percent that are labeled benign. A specific example method to calculate "maliciousness" of a tag may proceed as follows: (a) the percentages may first be normalized; (b) next a difference between the percentages that are malicious versus benign may be taken; (c) next that difference is added by 1; and (d) the sum is divided by 2 in order to normalize to a 0 to 1 range and to remove any bias from size differences in the benign versus malicious sets. Using the above example calculation, a maliciousness rating for every tag in an uncategorized sample could be determined. A score of 0.5 could mean that the tag is equally likely to be present in malware or benign files, while a score of 0.96 could warrant investigation for a malicious file. As another example, a tag that shows up in 90% of malware and 10% of benign files would give a score of 0.8. Results from the scoring may be communicated to the user terminal 22 in any known manner.

As a further example, the tags in FIG. 3 could be scored using the same scoring system. Since tag ID #1 is present in both the benign sample 38 and malicious sample 40, tag ID #1 would result in a score of 0.50, which indicates that it is equally likely that tag ID #1 is present in a benign file and a malicious file. Tag ID #2 is present only in the malicious sample so that the above calculation would result in tag ID #2 having a score of 1.0, which would indicate the highest probability that tag ID #2 is present in a malicious sample (which may correspond to the score indicating that the tag and/or file is completely malicious). Finally, tag ID #3 is only present in the benign sample and would result in a score of 0.0, which would be the lowest relative maliciousness score for a tag (which may correspond to the score indicating that the tag and/or file is completely benign).

Another way to score tags would be to calculate:

tag score=% apt/(% apt+% benign)

Where "% apt" is the percent of known malicious files/samples linked to the tag and where "% benign" is the percent of known benign files/samples linked to the tag. With the previous example, a tag that shows up in 90% of malware and 10% of benign files would give a score of 90% for this scoring mechanism.

A method for scoring an entire file from the groups of tags drawn from such a file may be performed as follows: When analyzing a new file, the file is first run through all of the appropriate tools and analyzers to extract its tags. Next, any tags which are unknown (they don't already exist in the database 12) are pared out (because they are unknown they may not be used for scoring). The remaining tags that are known according to the database 12 are each scored. An average tag score may then be calculated to reach a 'maliciousness' rating for the sample as a whole. It is also possible to utilize logic to assure that the scored set is a large enough sample size to calculate an accurate score. For example, if the database 12 only has knowledge of 2 or 3 tags out of the thousands taken from a received file, this may be too small of a set to take any action.

In addition to the maliciousness scores for tags, a weighting could also be applied to improve the system's fidelity. There are a variety of ways to perform such a weighting. One example is to weigh each score based upon the number of the tag's "links" (the number of samples in the many-to-many database structure in which the tag is associated) divided by the total number of samples represented in the many-to-many database. For example, if a tag "MZ" appears in all .EXE files (both benign and malicious), then this tag appearing in a sample under investigation effectively says nothing about the maliciousness of the file, since it's equally likely to appear in a benign file versus a malicious one. The system would weigh that tag at 0.5. Alternatively, if we have a set of thousands of samples and there is a tag shared by just two of them, that link would be a very strong tie between them and would be reflected by having a very high weight. Additionally, weighing can be done based on an attribute type. For instance, a typical .EXE file may have thousands of strings in it, but when run dynamically the .EXE file only connects to a single command and control server. If two samples contain no overlapping strings, but do connect to the same C2, it may be advantageous to emphasize the C2 commonality. One way to do this is to calculate a score and weight for each attribute type. In such an embodiment, the system may first calculate an average score for each tag type or category. Then, the system may combine the category scores (with each category having equal weight, or by applying deliberate weighting) to provide an overall score. For example, if a sample has 99 strings and connects to a single C2 domain, the C2 domain tag may be weighted to make up 50% of the overall score (rather than 1% if the tags were weighted equally). These group scores can then be combined to eliminate bias toward attribute types which tend to have large sizes. Consequently, when calculating an overall file score as discussed above, weighted tag scores could be used in such a calculation.

With the many-to-many database structure 36 described herein, a set characterization analytic function may be provided. For example, a set of samples of interest is identified. Perhaps an intelligence source identifies them all as being used by a specific APT campaign, they all match the same AV signature, or maybe a malware analyst just happens to know they're all identified as a campaign X backdoor. Looking at tags related to at least one sample from the set of interest, the following can be performed: for each of such tags, the percent of samples associated with that tag from the set of interest and the percent of known malicious files associated with that tag from the database(s) can be compared—such as taking the difference, and then normalize to a 0-1 range.

From such scores the tags can be sorted from highest to lowest, which produces a sorted list of the tags that best 'identify' this set of malware (where the sorted list may be communicated in any known manner to the user terminal 22). A score of 1.0, for instance, indicates that this tag is present in every sample in the set and none of the samples outside of it—it basically defines the set. Other high value tags may also be helpful in describing the set. Alternatively, scores of 0 may indicate traits that are lacking in this set of interest. If a tag is found in every sample of malware we have except those in the set, this characteristic may also something quite interesting from an analytical point of view. Additionally, combining this sort of analysis with the automated cluster generation discussed below provides a framework for allowing analysis with sets of malware rather than individual samples.

With the many-to-many database structure 36 described herein, a signature development tool may also be provided. Again, a set of malware of interest may be gathered. For each tag related to one of the samples in the set of interest, percent of samples in the set of interest linked to the tag may be determined. Then, instead of looking at the percentage of other malware linked to the tag, the percent of known benign samples linked to the tag in the many-to-many database structure is determined. As before, the difference may be taken, normalized and sorted, producing a list which lists likely signature from best to worse.

A score of 1.0 indicates a tag seen in every sample in the set of interest and none of the known benign samples. Other high scores (of say 0.95+) may show tags which may not work as signatures on their own, but would make good candidates for combining to make a solid signature. Building out logic to permute difference combinations of high scores and testing for 0 benign links would be relatively trivial.

Scores for tags and/or received files can be used to trigger alerts/notifications by the system (which may be communicated to a user terminal 22, for example), such as when the score is at or above a predetermined level, or at or below a predetermined level. When an alert fires (whether from match based on current disclosed embodiments, or a match based upon traditional rules), the current system may consume the file in question and calculate the similarity of a collection of tags in the sample to those of one or more known malicious and/or benign files. The system may perform steps described above to score tags that are known to the database 12, apply any weighting, and combining to provide an overall file score. If the score is high enough (indicating high probability of a malicious file) to warrant generating an alert, then the system may compare the file's tags with those of the known malicious samples/files in the database 12 to see which of such known malicious samples/files are related to the file under test. From this, the system may generate an ordered list of most to least related samples, which may be communicated to the user terminal 22. This list provides several avenues for aiding in an understanding the threat. The system may provide such a list of similarity scores to a user at terminal 22 along with a hyperlink to a page highlighting overlapping tags, tags unique to the received sample file, and/or tags unique to known file. Viewed by a trained analyst or by an expert system, the list and associated overlap information can be used to determine if the two related samples are the same backdoor or family, for example. This greatly aids in being able to quickly determine if the alert is a false positive or true positive.

Similarity algorithms may use a Jaccard Index (though other similarity algorithms may also be used). A Jaccard Index generates a similarity score between two samples. A Jaccard distance is just Jaccard Intex-1. The distance matrix is generated by comparing N samples among themselves. It is basically an N×N 2D matrix where the value in a given row/column is the Jaccard Index calculated between the samples respectively associated with the row number and the column number. For example, the value in row 2/column 3 is the Jaccard Index between samples 2 and 3. This structure may be used to create a cluster plot of the samples, which may show similar samples clustered close to one another.

By using such a similarity algorithm, a received uncategorized sample file may be compared with known and categorized sample files in the database to help an analyst rapidly understand whether the unknown file is a threat by comparing the unknown file to similar, already documented malicious files. The comparison may also be used to highlight any overlaps and differences between such files. It is also possible to use such similarity algorithms to develop a similarity score between two uncategorized samples, which may indicate whether or not there is likelihood that the two uncategorized samples are two strains from the same malware.

Similarity measures may also be useful working with groups of file samples. Similarity scores are easily translated to distance matrices, which provide the ability to perform clustering. With clusters, an analyst can visually plot an unknown sample against a sample of known and categorized samples. Proximity to characterized clusters further aids in classifying the unknown sample.

The above alert enrichment process may also be simplified by merely adding additional data to the alert, by finding known file most similar to the alerting sample file, and providing commonalties between it and the alerting sample. If desired, the format can be even more succinct by only highlighting specific predefined tags like C2, dropped files, etc., which may be more important.

Additional relational data can also be brought in to enrich alerts. After finding the most similar known sample, information pertaining to a campaign or group that the similar known sample was attributed could also be provided. For example, the alerted received file is 89% similar to known sample X, which is attributed to group Y. From that, additional logic can be performed. Is group Y a high threat group? If so, an alert's priority may be adjusted based on that information, or some alternate action may be taken. Similarly, additional data known about group Y could be utilized in the analysis.

To provide additional context for various aspects of the current disclosure, the following discussion is intended to provide a brief, general description of a suitable computing environment in which the various aspects of the current disclosure may be implemented. While example embodiments of the current disclosure relate to the general context of computer-executable instructions that may run on one or more computers (e.g., computers 10 and/or 22), those skilled in the art will recognize that the embodiments also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the current disclosure may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media (i.e., non-transitory computer readable media) includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects of the current disclosure may include a computer that includes a processing unit, a system memory and a system bus. The system bus couples system components including, but not limited to, the system memory to the processing unit. The processing unit may be any of various commercially available processors. Dual microprocessors and other multi-processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the current disclosure.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as known to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications or data links to one or more remote computers. The remote computer(s) 22 may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections or data links (14, 18, 20) depicted could include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet. For the purposes of the current disclosure a data link between two components may be any wired or wireless mechanism, medium, system and/or protocol between the two components, whether direct or indirect, that allows the two components to send and/or received data with each other.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s) 10. The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

For the purposes of the current disclosure a "database" is any organized collection of data in electronic form (e.g., accessible by a computer), set up in a manner so that computer (s) can access the data stored in the database through appropriate operation of computer software.

Following from the above description and summaries, it should be apparent to those of ordinary skill in the art that, while the methods, apparatuses and data structures herein described constitute exemplary embodiments of the current disclosure, it is to be understood that the inventions contained herein are not limited to the above precise embodiments and that changes may be made without departing from the scope of the inventions as claimed. For example, it is not necessary that the exact form of the many-to-many database structure 36 illustrated and discussed herein be utilized to fall within the scope of the claims, since the described and illustrated many-to-many database structure 36 is merely a single example of numerous many-to-many data structures that could satisfy the functionality described herein for such structure. As another example, is not necessary that the exact form of the tag record structure 24 described and illustrated herein be utilized to fall within the scope of the claims, since the described and illustrated tag record structure 24 is merely a single example of numerous data structures for containing tag data to satisfy the functionality described herein for such structure.

Likewise, it is to be understood that it is not necessary to meet any or all of the identified advantages or objects of the inventions disclosed herein in order to fall within the scope of the inventions, since inherent and/or unforeseen advantages of the current disclosed embodiments may exist even though they may not have been explicitly discussed herein.

What is claimed is:

1. A system for malware file detection and identification, comprising:
    (A) one or more databases containing a multitude of tags, each tag associated with at least one of (i) one or more of a plurality of known malicious files and (ii) one or more of a plurality of known benign files, each of the plurality of known malicious files having a plurality of the tags respectively associated with that known malicious file and each of the plurality of known benign files having a plurality of the tags respectively associated with that known benign file, the tags including,
        a tag identification code,
        a tag type corresponding to the type of information held by the tag, and
        a tag value corresponding to the value of the information held by the tag,
    the one or more databases including a many-to-many relational structure relating each known benign file to the plurality of tags respectively associated with that known benign file, and relating each known malicious file with the plurality of tags respectively associated with that known malicious file; and
    (B) at least one computer, having access to the one or more databases, and being programmed to perform the steps of:
        receiving a file,
        analyzing the received file to generate a plurality of tags associated with the received file,
        comparing the tags generated from the received file with the tags in the one or more databases to identify tags in the one or more databases that match tags generated from the received file,
        calculating a tag score for a tag generated from the received file based upon the number of malicious files associated with a matching tag from the one or more databases and the number of benign files associated with the matching tag from the one or more databases, and
        rendering a notification that the received file is potentially malicious based upon a comparison of the tag score to a predetermined value and displaying to a user information regarding one or more of the known malicious files to which the received file is determined by the computer to be similar.

2. The system of claim 1, wherein the computer is further programmed to dynamically update the relational structure of the one or more databases based upon a categorization of the received file as one of a malicious file and a benign file.

3. The system of claim 1, wherein available tag types include the following:
    outbound IP connection type,
    application program interface call type,
    ASCII string type.

4. The system of claim 1, wherein the computer is further programmed to calculate a weight value for the tag score based upon the number of known malicious and known benign files associated with the matching tag as compared to the total number of known malicious and known benign files associated with tags in the relational structure in the one or more databases.

5. The system of claim 4, wherein the weight value is only calculated for tags of a particular tag type.

6. The system of claim 4, wherein the computer is further programmed to:
    calculate a plurality of tag scores and weight values for a respective plurality of tags generated from the received file; and
    calculate a similarity score between the received file and another file based upon the plurality of tag scores and weight values, wherein the similarity score is a value pertaining to how similar the received file is to the other file.

7. The system of claim 1, wherein the computer is further programmed to calculate a similarity score for the received file versus a known malicious file based upon the tags generated from the received file and the tags in the one or more databases associated with the known malicious file, wherein the similarity score is a value pertaining to how similar the received file is to the known malicious file.

8. The system of claim 7, wherein the similarity score is calculated for a plurality of known malicious files and the computer is further programmed to determine one or more of the known malicious files having the highest similarity scores and then display information to a user pertaining to the one or more known malicious files having the highest similarity scores.

9. The system of claim 8, wherein the computer is further configured to generate a display illustrating commonalties between the received file and the one or more known malicious files having the highest similarity scores.

10. The system of claim 7, wherein the similarity score is calculated for all known malicious files having a matching tag.

11. The system of claim 1, wherein the programmed step of analyzing the received file to generate a plurality of tags associated with the received file includes pulling information from the received file, wherein such pulled information is taken from a group consisting of: metadata information, hashes, attributes, and header fields.

12. The system of claim 1, wherein the programmed step of analyzing the received file to generate a plurality of tags associated with the received file includes determining changes made to a clean sandbox computer system by operating the received file on the clean sandbox system.

13. The system of claim 1, wherein the programmed step of analyzing the received file to generate a plurality of tags associated with the received file includes:
   includes pulling information from the received file, wherein such pulled information is taken from a group consisting of: metadata information, hashes, attributes, and header fields; and
   determining changes made to a clean sandbox computer system by operating the received file on the clean sandbox system;
   wherein the plurality of tags include at least one of IP or domain connections, API calls, operating system registry modifications, created files, modified files, deleted files, ASCII strings, Unicode strings, signature matches on specific strings and signature matches on binary data.

14. A system for malware file detection and identification, comprising:
   (A) one or more databases containing a multitude of tags, each tag associated with at least one of (i) one or more of a plurality of known malicious files and (ii) one or more of a plurality of known benign files, each of the plurality of known malicious files having a plurality of the tags respectively associated with that known malicious file and each of the plurality of known benign files having a plurality of the tags respectively associated with that known benign file, the tags including,
      a tag identification code,
      a tag type corresponding to the type of information held by the tag, and
      a tag value corresponding to the value of the information held by the tag,
   the one or more databases including a many-to-many relational structure relating each known benign file to the plurality of tags respectively associated with that known benign file, and relating each known malicious file with the plurality of tags respectively associated with that known malicious file; and
   (B) at least one computer, having access to the one or more databases, and being programmed to perform the steps of:
      receiving a file,
      analyzing the received file to generate a plurality of tags associated with the received file,
      comparing the tags generated from the received file with the tags in the one or more databases to identify tags in the one or more databases that match tags generated from the received file,
      calculating a similarity score for the received file versus one or more known malicious files based upon the tags generated from the received file and the tags in the one or more databases associated with the one or more known malicious files, and
      displaying to a user information regarding one or more of the known malicious files having the highest similarity scores with the received file.

15. The system of claim 14, wherein the programmed step of calculating a similarity score involves building a distance matrix between the tags generated from the received file and the tags in the one or more databases associated with the one or more known malicious files.

16. The system of claim 15, wherein the similarity score is calculated utilizing a Jaccard Index.

17. The system of claim 14, wherein the computer is further programmed to perform the steps of:
   scoring each matching tag based upon the number of malicious and benign files associated with the matching tag in the many-to-many relational structure; and
   scoring the received file based upon the scores of the matching tags.

18. The system of claim 17, wherein the programmed step of scoring the received file includes a programmed step of computing an average score for the scores of the matching tags.

19. The system of claim 17, wherein the programmed step of scoring the received file includes the programmed steps of:
   weighting the scores for the matching tags; and
   computing an average score for the weighted scores of the matching tags.

20. The system of claim 14, wherein the programmed step of analyzing the received file to generate a plurality of tags associated with the received file includes pulling information from the received file, wherein such pulled information is taken from a group consisting of: metadata information, hashes, attributes, and header fields.

21. The system of claim 14, wherein the programmed step of analyzing the received file to generate a plurality of tags associated with the received file includes determining changes made to a clean sandbox computer system by operating the received file on the clean sandbox system.

22. The system of claim 14, wherein the programmed step of analyzing the received file to generate a plurality of tags associated with the received file includes:
   includes pulling information from the received file, wherein such pulled information is taken from a group consisting of: metadata information, hashes, attributes, and header fields; and
   determining changes made to a clean sandbox computer system by operating the received file on the clean sandbox system;
   wherein the plurality of tags include at least one of IP or domain connections, API calls, operating system registry modifications, created files, modified files, deleted files, ASCII strings, Unicode strings, signature matches on specific strings and signature matches on binary data.

* * * * *